United States Patent
Hundt et al.

(10) Patent No.: US 9,902,891 B2
(45) Date of Patent: Feb. 27, 2018

(54) HEAVY-ATOM RESIN FORMULATION FOR USE IN SUBTERRANEAN WELLS

(71) Applicant: Halliburton Energy Services, Inc., Houston, TX (US)

(72) Inventors: Greg Hundt, Spring, TX (US); Jeffery Dwane Karcher, Houston, TX (US); Paul Joseph Jones, Humble, TX (US)

(73) Assignee: Halliburtgon Energy Services, Inc., Houston, TX (US)

( * ) Notice: Subject to any disclaimer, the term of this patent is extended or adjusted under 35 U.S.C. 154(b) by 0 days.

(21) Appl. No.: 14/909,956

(22) PCT Filed: Sep. 4, 2013

(86) PCT No.: PCT/US2013/057909
§ 371 (c)(1),
(2) Date: Feb. 3, 2016

(87) PCT Pub. No.: WO2015/034474
PCT Pub. Date: Mar. 12, 2015

(65) Prior Publication Data
US 2016/0177167 A1    Jun. 23, 2016

(51) Int. Cl.
*C09K 8/44* (2006.01)
*E21B 33/14* (2006.01)
*C04B 24/28* (2006.01)
*C09K 8/508* (2006.01)

(52) U.S. Cl.
CPC .............. *C09K 8/44* (2013.01); *C04B 24/281* (2013.01); *C09K 8/508* (2013.01); *E21B 33/14* (2013.01)

(58) Field of Classification Search
None
See application file for complete search history.

(56) References Cited

U.S. PATENT DOCUMENTS

| | | | |
|---|---|---|---|
| 3,549,591 A | 12/1970 | Griffith | |
| 4,042,032 A * | 8/1977 | Anderson | C09K 8/5086 166/276 |
| 5,218,015 A | 1/1993 | Yasuda et al. | |
| 6,448,206 B1 | 9/2002 | Griffith et al. | |
| 2010/0210480 A1* | 8/2010 | Ballard | C09K 8/502 507/117 |
| 2010/0326660 A1 | 12/2010 | Ballard et al. | |
| 2012/0328377 A1* | 12/2012 | Brenneis | C04B 28/021 405/267 |

OTHER PUBLICATIONS

International Preliminary Report on Patentability issued in related PCT Application No. PCT/US2013/057909 dated Mar. 17, 2016, 17 pages.
International Search Report and Written Opinion issued in related PCT Application No. PCT/US2013/057909 dated Jun. 17, 2014, 24 pages.

* cited by examiner

*Primary Examiner* — Jeffrey Washville
(74) *Attorney, Agent, or Firm* — Craig Roddy; Baker Botts L.L.P.

(57) ABSTRACT

A fluid composition comprising: (A) a liquid hardenable resin component comprising a resin; and (B) a hardening agent component comprising a hardening agent for the resin; wherein at least one of the resin or the hardening agent comprises a molecule having at least one heavy atom. The substitution of one or more heavy atoms that have a higher atomic weight than the other atoms of the molecule, increases the molecular mass of the resin or hardening agent, and hence, the density of the fluid composition. A method of treating a treatment zone of a well, the method comprising: introducing the treatment fluid into a well bore; and allowing the treatment fluid to form a hardened mass the well bore.

18 Claims, No Drawings

HEAVY-ATOM RESIN FORMULATION FOR USE IN SUBTERRANEAN WELLS

CROSS-REFERENCE TO RELATED APPLICATIONS

The present application is a U.S. National Stage Application of International Application No. PCT/US2013/057909 filed Sep. 4, 2013, which is incorporated herein by reference in its entirety for all purposes.

TECHNICAL FIELD

The disclosure is in the field of producing crude oil or natural gas from subterranean formations. More particularly, the present disclosure relates to methods for servicing wellbores with hardenable resin compositions.

BACKGROUND

Natural resources such as gas, oil, and water residing in a subterranean formation or zone are usually produced by drilling a well bore into the subterranean formation while circulating a drilling fluid in the well bore.

After a portion of the wellbore is drilled, sections of steel pipe, referred to as casing, which are slightly smaller in diameter than the borehole, are placed in at least the uppermost portions of the wellbore. The casing provides structural integrity to the newly drilled borehole.

Cementing is a common well operation. For example, hydraulic cement compositions can be used in cementing operations in which a string of pipe, such as casing or liner, is cemented in a wellbore. The cement stabilizes the pipe in the wellbore and prevents undesirable migration of fluids along the annulus between the wellbore and the outside of the casing or liner from one zone along the wellbore to the next. Where the wellbore penetrates into a hydrocarbon-bearing zone of a subterranean formation, the casing can later be perforated to allow fluid communication between the zone and the wellbore. The cemented casing also enables subsequent or remedial separation or isolation of one or more production zones of the wellbore by using downhole tools, such as packers or plugs, or by using other techniques, such as forming sand plugs or placing cement in the perforations. Waste disposal wells also benefit from primary cementing with resins due to their greater chemical and acid resistance than cement.

Secondary or remedial cementing operations may also be performed, for example, to repair a primary cementing or treat conditions within the well bore after the well bore has been constructed.

A variety of treatment fluids, including non-cementitious sealants, such as polymer-based, resin-based, or latex-based sealants, have been used in these secondary or remedial cementing operations. These compositions may be introduced and circulated through the well bore to plug a void or crack in the conduit or cement sheath or an opening between the two. In addition, such non-cementitious sealants may have other uses or applications in a well.

Proper placement of a setting composition is possible by controlling the density of the cement or resin. The desired density for a cement or resin is dependent on the well conditions. In general, but not always, lighter density resin systems are typically used in surface casing and higher density resin systems are generally used in deeper parts of the wellbore.

The control of resin density is critical for a successful well construction or remediation. To help control the density of a settable sealant composition, particulate weighting agents, such as barite ($BaSO_4$), sand, hematite, or silica flour, can be used, including for resin systems. However, in some slow curing formulations, dispersions of these weighting agents in resin can become physically unstable due to thermal thinning of resins. This instability manifests itself by settling of the weighting agent in the resin during curing resulting in a resin system with a density gradient rather than homogeneous density throughout. This problem is most pronounced in systems without curing accelerator as the resin requires prolonged thickening times.

Amongst many uses for epoxy resins, applications in the oil and gas industry are unique in their demand for long resin pot life and controlled density.

GENERAL DESCRIPTION OF EMBODIMENTS

In an embodiment of the present disclosure, a fluid composition is provided, the fluid composition comprising: (A) a resin; and (B) a hardening agent for the resin; wherein at least one of the resin or the hardening agent comprises a molecule having at least one heavy atom.

In another embodiment, in addition to or in the alternative to a the resin or the hardening agent comprising a molecule having at least one halogen atom, a reactive diluent can be included, wherein the reactive diluent comprises a molecule having be at least one halogen atom.

Generally, resins, hardeners, or reactive diluents are molecules composed of the atoms carbon, hydrogen, oxygen, and nitrogen. As these constituent atoms have relatively low atomic masses, the density of the resulting resin molecules is also relatively low. The substitution of one or heavy atoms that have a higher atomic weight than the other atoms of the resin molecule or hardening agent increases the molecular mass of the resin or hardening agent to a greater extent than it increases molecular volume, and hence, the density of the fluid composition with the resin and hardening agent.

For example, halogen atoms have a higher atomic weight and density than carbon, hydrogen, oxygen, or nitrogen. In addition, halogen atoms substituted onto carbon atoms should be selected for not otherwise adversely affect the chemistry of the resin or hardener. In general, halogens attached to aromatic rings should have no adverse effect on resin chemistry. Larger halogens, for example, iodine and bromide, could have an impact on resin chemistry when substituted onto aliphatic carbons. In these cases, the carbon-halogen bond would be electrophilic and could possibly react with the hardener.

In an embodiment of the present disclosure, a fluid composition is provided, the fluid composition comprising: (A) a liquid hardenable resin component comprising a resin; and (B) a hardening agent component comprising a hardening agent for the resin; wherein at least one of the resin or the hardening agent comprises a molecule having at least one heavy atom.

In another embodiment, a method of servicing a well bore is provided, the method comprising: introducing a fluid composition according to the disclosure into a well bore; and allowing the fluid composition to set to a hardened mass the well bore. The molecule having at least one heavy atom can be selected to help control the density of the treatment fluid.

These and other embodiments of the disclosure will be apparent to one skilled in the art upon reading the following detailed description. While the disclosure is susceptible to various modifications and alternative forms, specific embodiments thereof will be described in detail and shown by way of example. It should be understood, however, that it is not intended to limit the disclosure to the particular forms disclosed.

DETAILED DESCRIPTION OF PRESENTLY PREFERRED EMBODIMENTS AND BEST MODE

Definitions and Usages

General Interpretation

The words or terms used herein have their plain, ordinary meaning in the field of this disclosure, except to the extent explicitly and clearly defined in this disclosure or unless the specific context otherwise requires a different meaning.

The words "comprising," "containing," "including," "having," and all grammatical variations thereof are intended to have an open, non-limiting meaning. For example, a composition comprising a component does not exclude it from having additional components, an apparatus comprising a part does not exclude it from having additional parts, and a method having a step does not exclude it having additional steps. When such terms are used, the compositions, apparatuses, and methods that "consist essentially of" or "consist of" the specified components, parts, and steps are specifically included and disclosed. As used herein, the words "consisting essentially of," and all grammatical variations thereof are intended to limit the scope of a claim to the specified materials or steps and those that do not materially affect the basic and novel characteristic(s) of the claimed disclosure.

The indefinite articles "a" or "an" mean one or more than one of the component, part, or step that the article introduces.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values.

Oil and Gas Reservoirs

In the context of production from a well, "oil" and "gas" are understood to refer to crude oil and natural gas, respectively. Oil and gas are naturally occurring hydrocarbons in certain subterranean formations.

A "subterranean formation" is a body of rock that has sufficiently distinctive characteristics and is sufficiently continuous for geologists to describe, map, and name it.

A subterranean formation having a sufficient porosity and permeability to store and transmit fluids is sometimes referred to as a "reservoir."

A subterranean formation containing oil or gas may be located under land or under the seabed off shore. Oil and gas reservoirs are typically located in the range of a few hundred feet (shallow reservoirs) to a few tens of thousands of feet (ultra-deep reservoirs) below the surface of the land or seabed.

Well Servicing and Fluids

Generally, well services include a wide variety of operations that may be performed in oil, gas, geothermal, or water wells, such as drilling, cementing, completion, and intervention. Well services are designed to facilitate or enhance the production of desirable fluids such as oil or gas from or through a subterranean formation. A well service usually involves introducing a fluid into a well.

A "well" includes a wellhead and at least one wellbore from the wellhead penetrating the earth. The "wellhead" is the surface termination of a wellbore, which surface may be on land or on a seabed.

A "well site" is the geographical location of a wellhead of a well. It may include related facilities, such as a tank battery, separators, compressor stations, heating or other equipment, and fluid pits. If offshore, a well site can include a platform.

The "wellbore" refers to the drilled hole, including any cased or uncased portions of the well or any other tubulars in the well. The "borehole" usually refers to the inside wellbore wall, that is, the rock surface or wall that bounds the drilled hole. A wellbore can have portions that are vertical, horizontal, or anything in between, and it can have portions that are straight, curved, or branched. As used herein, "uphole," "downhole," and similar terms are relative to the direction of the wellhead, regardless of whether a wellbore portion is vertical or horizontal.

As used herein, introducing "into a well" means introducing at least into and through the wellhead. According to various techniques known in the art, tubulars, equipment, tools, or fluids can be directed from the wellhead into any desired portion of the wellbore.

As used herein, the word "tubular" means any kind of structural body in the general form of a tube. Tubulars can be of any suitable body material, but in the oilfield they are most commonly of steel. Examples of tubulars in oil wells include, but are not limited to, a drill pipe, a casing, a tubing string, a line pipe, and a transportation pipe.

As used herein, the term "annulus" means the space between two generally cylindrical objects, one inside the other. The objects can be concentric or eccentric. Without limitation, one of the objects can be a tubular and the other object can be an enclosed conduit. The enclosed conduit can be a wellbore or borehole or it can be another tubular. The following are some non-limiting examples illustrating some situations in which an annulus can exist. Referring to an oil, gas, or water well, in an open hole well, the space between the outside of a tubing string and the borehole of the wellbore is an annulus. In a cased hole, the space between the outside of the casing and the borehole is an annulus. In addition, in a cased hole there may be an annulus between the outside cylindrical portion of a tubular, such as a production tubing string, and the inside cylindrical portion of the casing. An annulus can be a space through which a fluid can flow or it can be filled with a material or object that blocks fluid flow, such as a packing element. Unless otherwise clear from the context, as used herein an "annulus" is a space through which a fluid can flow.

As used herein, the word "treatment" refers to any treatment for changing a condition of a portion of a wellbore or a subterranean formation adjacent a wellbore; however, the word "treatment" does not necessarily imply any particular treatment purpose. A treatment usually involves introducing a fluid for the treatment, in which case it may be referred to as a treatment fluid, into a well. As used herein, a "treatment fluid" is a fluid used in a treatment. The word "treatment" in the term "treatment fluid" does not necessarily imply any particular treatment or action by the fluid.

In the context of a well or wellbore, a "portion" or "interval" refers to any downhole portion or interval along the length of a wellbore.

A "zone" refers to an interval of rock along a wellbore that is differentiated from uphole and downhole zones based on hydrocarbon content or other features, such as permeability, composition, perforations or other fluid communication with the wellbore, faults, or fractures. A zone of a wellbore that penetrates a hydrocarbon-bearing zone that is capable of producing hydrocarbon is referred to as a "production zone." A "treatment zone" refers to an interval of rock along a wellbore into which a fluid is directed to flow from the wellbore. As used herein, "into a treatment zone" means into and through the wellhead and, additionally, through the wellbore and into the treatment zone.

Generally, the greater the depth of the formation the higher the static temperature and pressure of the formation. Initially, the static pressure equals the initial pressure in the formation before production. After production begins, the static pressure approaches the average reservoir pressure.

A "design" refers to the estimate or measure of one or more parameters planned or expected for a particular fluid or stage of a well service or treatment. For example, a fluid can be designed to have components that provide a minimum density or viscosity for at least a specified time under expected downhole conditions. A well service may include design parameters such as fluid volume to be pumped, required pumping time for a treatment, or the shear conditions of the pumping.

The term "design temperature" refers to an estimate or measurement of the actual temperature at the downhole environment during the time of a treatment. For example, the design temperature for a well treatment takes into account not only the bottom hole static temperature ("BHST"), but also the effect of the temperature of the fluid on the BHST during treatment. The design temperature for a fluid is sometimes referred to as the bottom hole circulation temperature ("BHCT"). Because fluids may be considerably cooler than BHST, the difference between the two temperatures can be quite large. Ultimately, if left undisturbed a subterranean formation will return to the BHST.

Chemical Polymers and Derivatives

As used herein, unless the context otherwise requires, a "polymer" or "polymeric material" can include one or more homopolymers, copolymers, terpolymers, etc. In addition, the term "copolymer" as used herein is not limited to the combination of polymers having two monomeric units, but includes any combination of monomeric units, for example, terpolymers, tetrapolymers, etc.

As used herein, "modified" or "derivative" means a chemical compound formed by a chemical process from a parent compound, wherein the chemical backbone skeleton of the parent compound is retained in the derivative. The chemical process preferably includes at most a few chemical reaction steps, and more preferably only one or two chemical reaction steps. As used herein, a "chemical reaction step" is a chemical reaction between two chemical reactant species to produce at least one chemically different species from the reactants (regardless of the number of transient chemical species that may be formed during the reaction). An example of a chemical step is a substitution reaction. Substitution on the reactive sites of a polymeric material may be partial or complete.

Phases and Physical States

As used herein, "phase" is used to refer to a substance having a chemical composition and physical state that is distinguishable from an adjacent phase of a substance having a different chemical composition or a different physical state.

The word "material" refers to the substance, constituted of one or more phases, of a physical entity or object. Rock, water, air, metal, sand, wood, and cement are all examples of materials.

As used herein, if not other otherwise specifically stated, the physical state or phase of a substance (or mixture of substances) and other physical properties are determined at a temperature of 77° F. (25° C.) and a pressure of 1 atmosphere (Standard Laboratory Conditions) without applied shear.

Dispersions

A dispersion is a system in which particles of a substance of one chemical composition and physical state are dispersed in another substance of a different chemical composition or physical state. In addition, phases can be nested. If a substance has more than one phase, the most external phase is referred to as the continuous phase of the substance as a whole, regardless of the number of different internal phases or nested phases.

Fluids

A fluid can be a homogeneous or heterogeneous. In general, a fluid is an amorphous substance that is or has a continuous phase of particles that are smaller than about 1 micrometer that tends to flow and to conform to the outline of its container.

Every fluid inherently has at least a continuous phase. A fluid can have more than one phase. The continuous phase of a treatment fluid is a liquid under Standard Laboratory Conditions.

Apparent Viscosity of a Fluid

Viscosity is a measure of the resistance of a fluid to flow. In everyday terms, viscosity is "thickness" or "internal friction." Therefore, pure water is "thin," having a relatively low viscosity whereas honey is "thick," having a relatively higher viscosity. Put simply, the less viscous the fluid is, the greater its ease of movement (fluidity). More precisely, viscosity is defined as the ratio of shear stress to shear rate.

Setting, Setting Materials, and Setting Compositions

As used herein, the term "set" means the process of a fluid becoming a solid by curing.

As used herein, a "setting composition" is a fluid composition that sets.

Depending on the composition and the conditions, it can take just a few minutes up to days or longer for some setting compositions to set.

Compressive strength is defined as the capacity of a material to withstand axially directed pushing forces. The compressive strength a setting composition attains is a function of both curing time and temperature, among other things.

Pot life is the length of time a thermoset resin has sufficiently low viscosity for placement in a well or processing. This is the time the resin is sufficiently flowable to be pumped into a wellbore and placed in the correct location downhole. Commonly, the formulation of a thermoset resin composition is adjusted to give thickening times between about 2 hours to about 10 hours at a design temperature.

General Approach

Thermoset polymer resins exhibit high compressive strength and can tolerate high compressive strains without failure. As used herein, high compressive strength means at least 1,000 psi, for example, in the range of about 1,000 psi to about 20,000 psi.

According to this disclosure, a setting composition of a thermoset polymer resin is provided having a relatively high density. The resin or hardener molecules themselves are "weighted" by functionalization with high atomic weight substituents. More particularly, the substitution of one or more halogen atoms, which have a higher atomic weight than the other atoms of the molecule, increases the molecular mass of the resin or hardening agent to a greater extent than the increase to molecular volemu, and hence, increase density of the fluid composition with the resin and hardening agent.

This can be as an alternative to or in addition to including a high-density solid particulate in the resin system. In some embodiments, the density of the resin system is at least 10 ppg (specific gravity 1.2) without need for a solid particulate for weighting. In some embodiments, the density of the resin system is at least 12 ppg (specific gravity 1.44) without need for a solid particulate for weighting. In some embodiments, the density of the resin system is at least 14 ppg (specific gravity 1.68) without need for a solid particulate for weighting.

As used herein, a "high atomic weight substituent" includes halogens, including, for example, fluorine, bromine, and iodine. The increase in density is more pronounced with the higher atomic weight halogens, but any halogen should increase the density of the cured resin because their atomic weight is higher than any of the other atoms in the resin (typically, carbon, hydrogen, oxygen, and nitrogen). Subject to cost concerns, however, the higher the atomic weight of the substituent, the higher the increase in molecular weight and density of the material. In addition, the toxicity and environmental concerns regarding organic materials with halogens tends to be: fluorine >bromine >iodine. Astatine is radioactive.

In an embodiment of the present disclosure, a fluid composition is provided, the fluid composition comprising: (A) a resin; and (B) a hardening agent for the resin; wherein at least one of the resin or the hardening agent comprises a molecule having at least one halogen atom. It will be understood that more than one resin or more than one hardening agent can be included, provided that at least one of at least one of the resins or at least one of the hardening agents comprises a molecule having at least one halogen atom.

In another embodiment, A fluid composition comprising: (A) a resin; and (B) a hardening agent for the resin; and (C) a reactive diluent; wherein at least one of the resin, the hardening agent, or the reactive diluent comprises a molecule having at least one heavy atom. It will be understood that more than one resin, more than one hardening agent, or more than one reactive diluent can be included in such an embodiment, provided that at least one of at least one of the resins, at least one of the hardening agents, or at least one of the reactive diluents comprises a molecule having at least one halogen atom.

Solvents and reactive diluents may be added to a resin formulation or for any of its components to reduce its viscosity for pumping and mixing. Examples of solvents are polyethelenglycols, polyethyleneglycol ethers, limonene, propylene carbonate, isopariffinic fluids, and heavy aromatic fluids. Reactive diluents are often preferred because they cure into the resin network whereas solvents do not. Examples of reactive diluents are alkyl glycidyl ethers and phenyl glycidyl ethers. In various embodiments of the disclosure, the reactive diluent is selected from the group consisting of: halogenated alkyl glycidyl ethers and halogenated phenyl glycidyl ethers.

In an embodiment of the present disclosure, a fluid composition is provided, the fluid composition comprising: (A) a liquid hardenable resin component comprising a resin; and (B) a hardening agent component comprising a hardening agent for the resin; wherein at least one of the resin or the hardening agent comprises a molecule having at least one halogen atom. It will be understood that more than one resin or more than one hardening agent can be included, provided that at least one of at least one of the resins or at least one of the hardening agents comprises a molecule having at least one halogen atom. In addition to or in the alternative to a the resin or the hardening agent comprising a molecule having at least one halogen atom, a reactive diluent can be included, wherein the reactive diluent comprises a molecule having be at least one halogen atom.

As will be described in more detail, a setting composition according to the disclosure can additionally include a solvent or reactive diluent, a cure accelerator, a silane coupling agent, and filler particles. Cure accelerators may be added to increase the rate that the resin hardens. Inert filler particles can be used to help control the density and to the strength of a resin formulation. Density control of the uncured setting composition can allow a resin formulation to displace other fluids during placement, such as in a wellbore environment.

These atomically-weighted resin systems require minimal formulation changes from their unweighted congeners. For example, adjustment of the resin design to the correct epoxide equivalent weight (EEW) is simple for those skilled in the art. This resin system can be deployed like any other resin formulation. The epoxide equivalent weigh is the number of grams per mole of reactive epoxide in a material. This can be used in combination with "amine equivalent weight (AEW)", which is the number in grams per mole of reactive amines (NH groups) in a material. These units allow for simple calculation of reaction stoichiometry between an epoxy resin and an amine hardener.

Such formulations according to the disclosure use an inherently more dense epoxy molecule. The resulting resin or hardener will be homogeneous on a molecular level. Such formulations allows the design weighted slurries which are indefinitely stable, present no settling, and can have lower viscosities than resin designs weighted with solid particulate filler materials, although they can be used in addition to a solid particulate filler.

In another embodiment, a method of servicing a well bore is provided, the method comprising: introducing a fluid composition according to the disclosure into a well bore; and allowing the fluid composition to form a hardened mass the well bore.

Such compositions can be used in various well operations, such as squeeze cementing operations, primary isolation in chemical disposal wells, and plug and abandonment. In addition, such compositions can be useful in the formation of secondary barriers in a well.

Halogenated Resin

In an embodiment, an epoxy resin can be halogenated, which provides a higher molecular weight for the resin. Generally, resins or hardeners are molecules composed of the atoms carbon, hydrogen, oxygen, and nitrogen. As these constituent atoms have relatively low atomic masses, the density of the resulting resin molecules is also relatively low. According to this disclosure, resins containing higher atomic weight substituents are used as a method for controlling the density of a setting composition and of the final set resin composition. The high density components of the resin impart a higher density to the cured resin product.

An example of a conventional resin is EPON 828™, which includes a diglycidyl ether of bisphenol A:

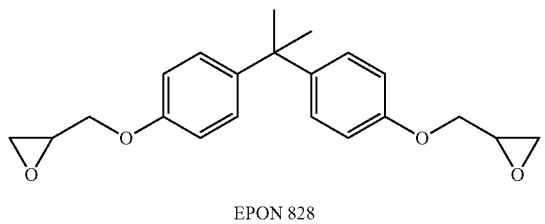 [SMILES: CC(C)(c1ccc(OCC2CO2)cc1)c1ccc(OCC2CO2)cc1]

EPON 828

Halogens can be attached directly to the aromatic rings or on the two methyl groups on the bridge between the aromatic rings.

An example of attaching halogen atoms to the aromatic rings includes the diglycidyl ether of 3,3',5,5' tetrabromobisphenol A, which is commercially available as D.E.R 560™ from Dow Chemical Company or as EPIKOTE 1163™ from Momentive Chemicals. This brominated resin is generally used for its fire-retardant properties.

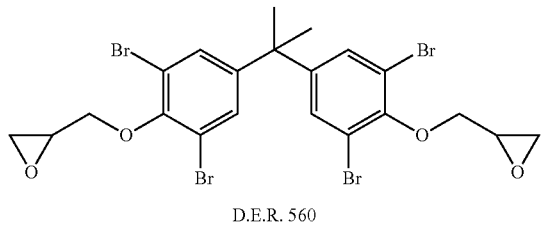 [SMILES: CC(C)(c1cc(Br)c(OCC2CO2)c(Br)c1)c1cc(Br)c(OCC2CO2)c(Br)c1]

D.E.R. 560

Similarly, an example of such a halogenated resin includes 3,3',5,5'tetrachlorobisphenol A diglycidyl ether is known in the scientific literature, although it does not appear to be commercially available at this time. Another example of such a halogenated resin includes 3,3',5,5' tetraiodobisphenol A diglycidyl ether.

An example of halogens being attached on the two methyl groups on the bridge between the aromatic rings includes the diglycidyl ether of bisphenol AF (also known as 4,4'-hexafluoroisopropylidenediphenol diglycidyl ether) is described in the literature, although it does not appear to be commercially available at this time.

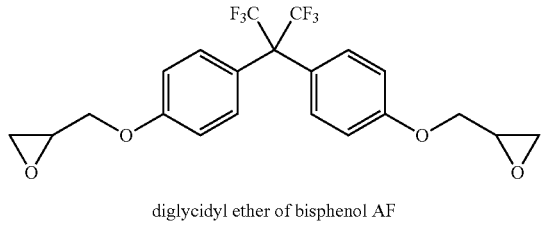 [SMILES: FC(F)(F)C(c1ccc(OCC2CO2)cc1)(c1ccc(OCC2CO2)cc1)C(F)(F)F]

diglycidyl ether of bisphenol AF

Other examples of halogenated resins can be based on resorcinol diglycidyl ether, which are also known as diglycidyl ethers of polyhydroxy phenols. U.S. Pat. No. 3,549,591 describes such halogenated resins based on resorcinol for improved water resistance.

Such structures as discussed herein illustrate commercially viable ways of introducing halogens onto an epoxy resin molecule.

Halogenated Hardener

In another embodiment, in alternative to the resin or in addition to the resin, the hardening agent can be comprises a molecule having at least one heavy atom. For example, in addition to amines, many other compounds can be used as hardeners for resin. These include carboxylic acids and carboxylic acid anhydrides. Halogenated versions of these compounds can be used to increase the density of a fluid composition of a resin and a hardener.

For example, a resin cured with tetrabromophthalic anhydride will have a higher density than the same resin cured with its non-halogenated analogue (phthalic anhydride). Phenols (and their halogenated analogues) may be used as hardeners. By way of another example, tetrabromobisphenol A can be used as a halogenated hardener and to increase the density of the composition.

Additional examples of halogenated amine hardeners include, without limitation, 4,4'-Methylenebis(3-chloro-2,6-diethylaniline) (also known as MCDEA), which is commercially available; 4,4'-Methylenebis(3-bromo-2,6-diethylaniline); and 4,4'-Methylenebis[2-chloroaniline] (also known as MOCA), which is commercially available.

Liquid Hardenable Resin Component

The treatment fluid of the present disclosure includes a liquid hardenable resin component comprising a resin.

Resin

As used herein, the term "resin" refers to any of a number of physically similar polymerized synthetics or chemically modified natural resins including thermoplastic materials and thermosetting materials.

Examples of liquid hardenable resins include: epoxy resins, novolac resins, furan/furfuryl alcohol resins, urethane resins, glycidyl ether resins, polyester bisphenol A-epichlorohydrin resins, bisphenol F-epichlorohydrin resins, bisphenol AF-epichlorohydrin resins, and tetrabromobisphenol A-epichlorohydrin resins.

Selection of a suitable resin may be affected by the temperature of the subterranean formation to which the fluid will be introduced. By way of example, for subterranean formations having a bottom hole static temperature ("BHST") ranging from about 50° F. (15° C.) to about 250° F. (121° C.), epoxy-based resin systems may be preferred.

Epoxy resins, also known as polyepoxides, are a class of reactive prepolymers and polymers which contain epoxide groups. Epoxy resins may be reacted (that is, cross-linked) either with themselves through catalytic homopolymerisation, or with co-reactants such as polyfunctional amines, carboxylic acids, acid anhydrides, phenols, alcohols, and thiols. These co-reactants are often referred to as hardeners, and the cross-linking reaction is commonly referred to as curing. Reaction of polyepoxides with themselves or with polyfunctional hardeners forms a thermosetting polymer, often with strong mechanical properties as well as high temperature and chemical resistance In an embodiment of the disclosed methods, the epoxy resin comprises a diglycidyl ether. In an embodiment, the diglycidyl ether is preferably non-polymeric. For example, the diglycidyl ether can be selected from the group consisting of: a diglycidyl ether of bisphenol A, optionally blended with butyl glycidyl ether, cyclohexane dimethanol diglycidyl ether, and any combination thereof.

Solvent or Diluent for Resin

In some embodiments, a solvent may be added to the resin to reduce its viscosity for ease of handling, mixing, or transferring. However, in particular embodiments, it may be desirable not to use such a solvent for environmental or safety reasons. It is within the ability of one skilled in the art with the benefit of this disclosure to determine if and how much solvent may be needed to achieve a viscosity suitable to the subterranean conditions of a particular application.

Factors that may affect this decision include geographic location of the well, the surrounding weather conditions, and the desired long-term stability of the well bore servicing fluid.

Generally, any solvent that is compatible with the hardenable resin and that achieves the desired viscosity effect may be suitable for use in the liquid hardenable resin component of the well bore servicing fluid. Such solvents may include, but are not limited to, polyethylene glycol, butyl lactate, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, d'limonene, fatty acid methyl esters, and combinations thereof. Other solvents may include aqueous dissolvable solvents such as, methanol, isopropanol, butanol, and glycol ether solvents, and combinations thereof. Glycol ether solvents include, but are not limited to, diethylene glycol methyl ether, dipropylene glycol methyl ether, 2-butoxy ethanol, ethers of a C2 to C6 dihydric alkanol containing at least one C1 to C6 alkyl group, mono ethers of dihydric alkanols, methoxypropanol, butoxyethanol, and hexoxyethanol, and isomers thereof.

Selection of an appropriate solvent may be dependent on the resin composition chosen. With the benefit of this disclosure, the selection of an appropriate solvent should be within the ability of one skilled in the art. In some embodiments, the amount of the solvent used in the liquid hardenable resin component may be in the range of about 0.1% to about 30% by weight of the liquid hardenable resin component.

Aqueous Diluent for Resin

In some embodiments, the liquid hardenable resin component may also comprise an aqueous diluent or carrier fluid to reduce the viscosity of the liquid hardenable resin component.

If the resin is hydrophobic, which is often the case, the resin may be dispersed in an aqueous phase as an emulsion.

The aqueous fluids used in the consolidation fluids of the present disclosure may comprise fresh water, saltwater (e.g., water containing one or more salts dissolved therein), brine (for example, saturated saltwater), seawater, or combinations thereof, and may be from any source, provided that they do not contain components that might adversely affect the stability or performance of the well bore servicing fluid.

In some embodiments, the aqueous diluent or carrier fluid may be present in the liquid hardenable resin component in an amount from about 0.1% to about 25% by volume of the liquid hardenable resin component. In other embodiments, the aqueous diluent or carrier fluid may be present in the liquid hardenable resin component in an amount from about 0.1% to about 5% by volume of the liquid hardenable resin component.

Heating to Reduce Viscosity of Resin

Optionally, the liquid hardenable resin component may be heated to reduce its viscosity, in place of, or in addition to, using a diluent, solvent, or carrier liquid.

Concentration of Resin in Liquid Hardenable Resin Component

Generally, the resin can be included in the liquid hardenable resin component in an amount in the range of about 5% to about 100% by volume of the liquid hardenable resin component. In particular embodiments, the hardenable resin may be included in the liquid hardenable resin component in an amount of about 75% to about 100% by volume of the liquid hardenable resin component. It is within the ability of one skilled in the art with the benefit of this disclosure to determine how much of the liquid hardenable resin may be needed to achieve the desired results. Factors that may affect this decision include the type of liquid hardenable resin and liquid hardening agent used in a particular application.

Concentration of Liquid Hardenable Resin Component in Treatment Fluid

Generally, the liquid hardenable resin component may be included in the treatment fluid in an amount from about 5% to about 90% by volume of the treatment fluid. In particular embodiments, the liquid hardenable resin component may be included in the treatment fluid in an amount from about 50% to about 75% by volume of the treatment fluid.

Hardening Agent Component

The treatment fluid of the present disclosure also includes a liquid hardening agent component comprising a hardening agent. As used herein, "hardening agent" or "hardener" refers to any substance capable of transforming the hardenable resin into a hardened, consolidated mass.

In addition, to hardening the resin, the hardener can increase the chemical resistance and structural properties of the cured resin system.

Hardening Agent for Liquid Hardening Agent Component

In principle, any molecule containing a reactive hydrogen may react with the epoxide groups of the epoxy resin. Common classes of hardeners for epoxy resins include amines, acids, acid anhydrides, phenols, alcohols, and thiols.

Examples of hardening agents include, but are not limited to, aliphatic amines, aliphatic tertiary amines, aromatic diamines (for example, diethyltoluenediamine or diaminodiphenylsulfone), cycloaliphatic amines, heterocyclic amines, aliphatic polyamines (for example, ethylenediamine or diethylenetriamine), amido amines, polyamides, polyethyl amines, polyether amines, polyoxyalkylene amines, carboxylic acids, carboxylic anhydrides, triethylenetetraamine, ethylene diamine, N-cocoalkyltrimethylene, isophorone diamine, N-aminophenyl piperazine, imidazoline, 1,2-diaminocyclohexane, polytheramine, diethyltoluenediamine, 4,4'-diaminodiphenyl methane, methyltetrahydrophthalic anhydride, hexahydrophthalic anhydride, maleic anhydride, polyazelaic polyanhydride, phthalic anhydride, and combinations thereof. Commercially available hardening agents may include, but are not limited to, ETHACURE™ 100, available from Albemarle Corp. of Baton Rouge, La., and JEFFAMINE™ D-230, a polyoxyalkylene amine available from Huntsman Corp. of The Woodlands, Tex.

In some embodiments, in particular embodiments, the hardening agent may comprise a fast-setting hardening agent and a slow-setting hardening agent. As used herein, "fast-setting hardening agent" and "slow-setting hardening agent" do not imply any specific rate at which the agents set a hardenable resin; instead, the terms merely indicate the relative rates at which the hardening agents initiate hardening of the resin. Whether a particular hardening agent is considered fast-setting or slow-setting may depend on the other hardening agent(s) with which it is used. In a particular embodiment, ETHACURE™ 100 may be used as a slow-setting hardening agent and JEFFAMINE™ D-230, may be used as a fast-setting hardening agent. In some embodiments, the ratio of fast-setting hardening agent to slow-setting hardening agent may be selected to achieve a desired behavior of liquid hardening agent component. For example, in some embodiments, the fast-setting hardening agent may be included in the liquid hardening agent component in a ratio of approximately 1:5, by volume, with the slow-setting hardening agent. With the benefit of this disclosure, one of ordinary skill in the art should be able to select the appropriate ratio of hardening agents for use in a particular application.

Accelerator for Liquid Hardening Agent Component

The epoxy curing reaction may be accelerated by addition of small concentrations of one or more accelerators. An accelerator can be added to an uncured resin and hardener system to increase the rate of curing (which will shorten the pot life). Typically, this is added to resin formulations adapted for use at lower temperatures of less than about 150° F. (65° C.). Most resin systems used in at higher temperatures do not require the use of an accelerator.

Some hardening agents are also considered to be accelerators for the hardening of the resin. Hardeners are generally primary or secondary amines, whereas accelerators are generally tertiary amines, carboxylic acids, and alcohols (especially phenols).

Examples of curing accelerators include, without limitation: organic acids (such as acetic acid, maleic acid, fumaric acid), inorganic acids (such as HCl, HF, $H_2SO_4$, $H_3PO_4$), Lewis acids (such as boron trifluoride, aluminum chloride, boron trifluoride ether complexes, boron trifluoride alcohol complexes, boron trifluoride amine complexes), sodium bisulfate, alkyl benzene sulfonic acids (such as toluenesulfonic acid or dodecylbenzenesulfonic acid), phenols (including phenol/formaldehyde resins), tertiary amines (such as 2,4,6-tris(dimethylaminomethyl)phenol, benzyl dimethylamine, and 1,4-diazabicyclo[2.2.2]octane), imidazole and its derivatives ((e.g., 2-ethyl,-4-methylimidazole, 2-methylimidazole, 1-(2-cyanoethyl)-2-ethyl-4-methylimidazole).

Concentration of Hardener in Liquid Hardening Agent Component

The hardening agent may be included in the liquid hardening agent component in an amount sufficient to at least partially harden the resin composition. In some embodiments of the present disclosure, the hardening agent used may be included in the liquid hardening agent component in the range of about 5% to about 100% by volume of the liquid hardening agent component. In other embodiments, the hardening agent used may be included in the liquid hardening agent component in an amount of about 10% to about 50% by volume of the liquid hardening agent component.

Optional Silane Coupling Agent for Liquid Hardening Agent Component

The liquid hardening agent component of the treatment fluid may also include an optional silane coupling agent. The silane coupling agent may be used, among other things, to act as a mediator to help bond the resin to the surface of the subterranean formation or the surface of the well bore. Silane agents may also increase the bonding of the resin to any solid particulate that may be included in the setting composition.

Examples of silane coupling agents include, but are not limited to, N-2-(aminoethyl)-3-aminopropyltrimethoxysilane; 3-glycidoxypropyltrimethoxysilane; gamma-aminopropyltriethoxysilane; N-beta-(aminoethyl)-gamma-aminopropyltrimethoxysilanes; aminoethyl-N-beta-(aminoethyl)-gamma-aminopropyl-trimethoxysilanes; gamma-ureidopropyl-triethoxysilanes; beta-(3,4 epoxy-cyclohexyl)-ethyl-trimethoxysilane; gamma-glycidoxypropyltrimethoxysilanes; vinyltrichlorosilane; vinyltris (beta-methoxyethoxy) silane; vinyltriethoxysilane; vinyltrimethoxysilane; 3-metacryloxypropyltrimethoxysilane; beta-(3,4 epoxycyclohexyl)-ethyltrimethoxysilane; gamma-glycidoxypropyltrimethoxysilane; gamma-glycidoxypropylmethylidiethoxysilane; N-beta-(aminoethyl)-gamma-aminopropyl-trimethoxysilane; N-beta-(aminoethyl)-gamma-aminopropylmethyldimethoxysilane; 3-aminopropyl-triethoxysilane; N-phenyl-gamma-aminopropyltrimethoxysilane; gamma-mercaptopropyltrimethoxysilane; gamma-chloropropyltrimethoxysilane; vinyltrichlorosilane; vinyltris (beta-methoxyethoxy) silane; vinyltrimethoxysilane; gamma-metacryloxypropyltrimethoxysilane; beta-(3,4 epoxycyclohexyl)-ethyltrimethoxysila; gamma-glycidoxypropyltrimethoxysilane; gamma-glycidoxypropylmethylidiethoxysilane; N-beta-(aminoethyl)-gamma-aminopropyltrimethoxysilane; N-beta-(aminoethyl) -gamma-aminopropylmethyldimethoxysilane;gamma-aminopropyltriethoxysilane; N-phenyl-gamma-aminopropyltrimethoxysilane; gamma-mercaptopropyltrimethoxysilane; gamma-chloropropyltrimethoxysilane; N[3-(trimethoxysilyl)propyl]-ethylenediamine; substituted silanes where one or more of the substitutions contains a different functional group; and combinations thereof. Generally, the silane coupling agent may be included in the liquid hardening agent component in an amount capable of sufficiently bonding the resin to the particulate.

Concentration of Silane Coupling Agent in Liquid Hardening Agent Component

In some embodiments of the present disclosure, the silane coupling agent may be included in the liquid hardening agent component in the range of about 0.1% to about 95% by volume of the liquid hardening agent component. In other embodiments, the fast-setting hardening agent may be included in the liquid hardening agent component in an amount of about 5% to about 50% by volume of the liquid hardening agent component. In other embodiments, the fast-setting hardening agent may be included in the liquid hardening agent component in an amount of about 25% by volume of the liquid hardening agent component.

Optional Solvent or Diluent for Liquid Hardening Agent Component

An optional diluent or liquid carrier fluid may also be used in the liquid hardening agent component to, among other things, reduce the viscosity of the liquid hardening agent component for ease of handling, mixing, or transferring. However, in some embodiments, it may be desirable, for environmental or safety reasons, not to use a solvent.

Any suitable carrier fluid that is compatible with the liquid hardening agent component and achieves the desired viscosity effects may be suitable for use in the present disclosure. Some suitable liquid carrier fluids are those having high flash points (for example, above about 125° F.) because of, among other things, environmental and safety concerns; such solvents may include, but are not limited to, polyethylene glycol, butyl lactate, butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, d' limonene, fatty acid methyl esters, and combinations thereof. In particular embodiments, selection of an appropriate liquid carrier fluid may be dependent on, inter alia, the resin composition chosen.

Concentration of Liquid Hardening Agent Component in Treatment Fluid

Generally, the liquid hardening agent component may be included in the treatment fluid in an amount from about 1% to about 50% by volume of the treatment fluid. In particular embodiments, the liquid hardening agent component may be included in the treatment fluid in an amount from about 5% to about 25% by volume of the treatment fluid.

In particular embodiments, the amount of liquid hardening agent composition may be selected to impart a desired elasticity or compressibility to a resulting well bore plug. Generally, the lower the amount of hardening agent present in the treatment fluid, the greater the elasticity or compressibility of a resulting well bore plug. With the benefit of this disclosure, it should be within the skill of one or ordinary skill in the art to select an appropriate amount of hardening agent to achieve a desired elasticity or compressibility for a particular application.

Optional Solid Particulate Materials in Composition of Treatment Fluid

In some embodiments of the present disclosure, one or more solid particulate materials may also be included in the treatment fluid to control density or viscosity of the cement composition or the physical properties and chemical resistance of the set material, such as strength, hardness, or toughness of the resulting set material. These materials are optional and need not be included in treatment fluid for that composition to fall within the teachings of the present disclosure.

Such solid materials may include both natural and man-made materials, and may have any shape, including, but not limited to, beaded, cubic, bar-shaped, cylindrical, or mixtures thereof, and may be in any form including, but not limited to flake or fiber form.

Examples of solid particulates that may be suitable in various cement compositions include, but are not limited to, cement, kiln dust, clays, aluminum oxide, awaruite, barium carbonate, barium oxide, barite, calcium carbonate, calcium oxide, chromite, chromium oxide, copper, copper oxide, dolomite, galena, gold, hematite, a hollow glass microsphere, ilmenite, iron oxide, siderite, magnetite, magnesium oxide, manganese carbonate, manganese dioxide, manganese (IV) oxide, manganese oxide, manganese tetraoxide, manganese (II) oxide, manganese (III) oxide, molybdenum (IV) oxide, molybdenum oxide, molybdenum trioxide, Portland cement, pumice, pyrite, spherelite, silica, silver, tenorite, titania, titanium (II) oxide, titanium (III) oxide, titanium (IV) dioxide, zirconium oxide, zirconium silicate, zinc oxide, cement-kiln dust, unexpanded and expanded perlite, attapulgite, bentonite, zeolite, elastomers, sand, siliceous fibers, polymer fibers, and lost circulation materials.

Fiber materials may include, but are not limited to, cellulose fibers, carbon fibers, glass fibers, mineral fibers, plastic fibers (for example, polypropylene and polyacrylic nitrile fibers), metallic fibers, metal shavings, Kevlar fibers, basalt fibers, wollastonite, micas (for example, phlogopites and muscovites), and mixtures thereof.

For example, carbon fibers suitable for use in particular embodiments of the present disclosure include high tensile modulus carbon fibers which have a high tensile strength. In some embodiments, the tensile modulus of the carbon fibers may exceed 180 GPa, and the tensile strength of the carbon fibers may exceed 3000 MPa. Generally, the fibers may have a mean length of about 1 mm or less. In some embodiments, the mean length of the carbon fibers is from about 50 to about 500 microns. In particular embodiment, the carbon fibers have a mean length in the range of from about 100 to about 200 microns. In particular embodiments, the carbon fibers may be milled carbon fibers. Commercially available carbon fibers include, but are not limited to, "AGM-94" and "AGM-99" carbon fibers both available from Asbury Graphite Mills, Inc., of Asbury, N.J.

Metallic fibers for use in particular embodiments of the present disclosure may include non-amorphous (that is, crystalline) metallic fibers. In particular embodiments, the non-amorphous metallic fibers may be obtained by cold drawing steel wires (that is, steel wool). Examples of metallic fibers include, but are not limited to, steel fibers. Generally, the length and diameter of the metallic fibers may be adjusted such that the fibers are flexible and easily dispersible in the treatment fluid, and the treatment fluid is easily pumpable.

These additional solid materials may be present in the treatment fluid of the present disclosure individually or in combination. Additionally, the solid materials of the present disclosure may be present in the treatment fluid in a variety of lengths or aspect ratios. A person having ordinary skill in the art, with the benefit of this disclosure, will recognize the mixtures of type, length, or aspect ratio to use to achieve the desired properties of treatment fluid for a particular application.

EXAMPLES

To facilitate a better understanding of the present disclosure, the following examples of certain aspects of some embodiments are given. In no way should the following examples be read to limit, or define, the entire scope of the disclosure.

A low density resin system can be designed using the conventional EPON 828™ resin and DETDA™ hardener, more fully identified above. By replacing all or part of this epoxy component with the diglycidyl ether of 3,3',5,5' tetrabromobisphenol A, a fluid resin composition with a higher inherent density can be realized. In the alternative or in addition to a high-density resin material, high-density compounds can be incorporated as hardeners to an epoxy system. For example, the diglycidyl ether of bisphenol A can be cured with halogenated amine hardeners. This material will have a higher density than if the same epoxy was cured with the non-halogenated amine hardener.

In the disclosure examples, the weights of resin and hardener were controlled so that there were an equal number of moles of reactive epoxy groups to reactive amine groups in each formulation.

Preparation of experimental control: EPON 828™ resin (400 g) and DETDA™ hardener (104.7 g) were mixed by hand until homogeneous. The resin mixture was poured into a 2-inch diameter plastic mold. The resin was cured at 180° F. (82° C.) for 24 hours. The hardened resin was then allowed to cool to room temperature and cut out of the mold. The sample density was measured via the Archimedes principle.

Preparation of experimental example: D.E.R 560™ resin (400 g) was heated to 180° F. to melt the solid resin. DETDA™ hardener (53.45 g) was mixed into the molten resin. The resin mixture was poured into a 2-inch diameter plastic mold and cured at 230° F. (110° C.) for 24 hours. The hardened resin was then allowed to cool to room temperature and cut out of the mold. The sample density was measured via the Archimedes principle.

Table 1 illustrates the concept of controlling the resin structure to adjust the density of the final resin. The brominated resin system increases the density of the cured resin over 14 ppg. Intermediate densities can be achieved, for example, by blending EPON 828™ resin and D.E.R 560™ resin.

TABLE 1

Adjustment of resin density by use of a halogenated resin.

| | Control | Example |
|---|---|---|
| Resin System | EPON 828 ™ resin (400 g) DETDA ™ hardener (104.7 g) | D.E.R 560 ™ resin (400 g) DETDA ™ hardener (53.45 g) |
| Density (ppg) | 9.79 | 14.17 |

Method of Treating a Well with the Fluid

According to another embodiment of the disclosure, a method of treating a well, is provided, the method including the steps of: forming a treatment fluid according to any of the embodiments of the disclosure; and introducing the treatment fluid into the well. The molecule having at least one heavy atom can be selected to help control the density of the treatment fluid.

Forming Treatment Fluid

A treatment fluid according to the disclosure can be prepared at the job site, prepared at a plant or facility prior to use, or certain components of the fluid can be pre-mixed prior to use and then transported to the job site. Certain components of the fluid may be provided as a "dry mix" to be combined with fluid or other components prior to or during introducing the fluid into the well.

If the fluid is being transported to the well-site, preferably the components for a treatment fluid according to the disclosure should not be allowed to freeze or be exposed to temperatures in excess of 120° F. (49° C.) for extended periods of time.

In certain embodiments, the preparation of a fluid can be done at the job site in a method characterized as being performed "on the fly." The term "on-the-fly" is used herein to include methods of combining two or more components wherein a flowing stream of one element is continuously introduced into flowing stream of another component so that the streams are combined and mixed while continuing to flow as a single stream as part of the on-going treatment. Such mixing can also be described as "real-time" mixing.

Conventional mixing equipment, such as a batch mixer or cementing equipment may be used.

If desired, the components can be introduced as separate treatment fluids and mixed downhole. The separate treatment fluids with the different components can be separated, for example, by water-based spacer or plugs.

The rheology, sag, and settling expectations in a fluid may vary based on formulation and temperature. Once mixed, time, temperature, and the degree of reaction influence setting time and the physical properties of a set material formed by the treatment fluid.

Conventional pre-job cement modeling estimations can be applied to this fluid.

Equipment in the well should be cleaned after exposure to the treatment fluid or its components. Certain downhole equipment, such as tools with movable parts, floats, or roller-cone drill bits may be adversely affected by a treatment fluid according to the disclosure if allowed to set near the equipment or it is not cleaned after use.

The equipment used in a treatment involving a treatment fluid according to the disclosure or its components can be cleaned by flushing and rinsing with a suitable solvent, for example, a mutual solvent such as Musol A.

Introducing into Well or Zone

Often the step of delivering a fluid into a well is within a relatively short period after forming the fluid, for example, less within 30 minutes to one hour. More preferably, the step of delivering the fluid is immediately after the step of forming the fluid, which is "on the fly."

It should be understood that the step of delivering a fluid into a well can advantageously include the use of one or more fluid pumps.

Introducing Below Fracture Pressure

In an embodiment, the step of introducing is at a rate and pressure below the fracture pressure of the treatment zone.

Allowing Time for Curing of Resin in the Well

After the step of introducing a fluid composition according to the disclosure, it would normally be desirable to allow time for setting of the composition in the well. This preferably occurs with time under the conditions in the zone of the subterranean fluid.

Flow Back Conditions

In an embodiment, the step of flowing back is after allowing time for setting of the composition in the well.

Returned Fluid Disposal

In an embodiment, any unused treatment fluid, or returned treatment, or components thereof should be collected for disposal, for example, in an open-top tank.

Hole Clean Out

If required, any hole that may need to be cleaned out as a result of a treatment fluid forming a solid barrier or plug according to the disclosure would need to be drilled out. It can form a permanent barrier, such that drilling would be required for its removal.

Producing Hydrocarbon from Subterranean Formation

Preferably, after any such use of a fluid according to the disclosure, a step of producing hydrocarbon from the well or a particular zone is the desirable objective.

Applications

Generally, the treatment fluids of the present disclosure may be used for any purpose. In some embodiments, the treatment fluid may be used to service a well bore that penetrates a subterranean formation.

Servicing a well bore includes, without limitation, positioning the treatment fluid in the well bore to isolate the subterranean formation from a portion of the well bore; to support a conduit in the well bore; to plug a void or crack in the conduit; to plug a void or crack in a cement sheath disposed in an annulus of the well bore; to plug a perforation; to plug an opening between the cement sheath and the conduit; to prevent the loss of aqueous or nonaqueous drilling fluids into loss circulation zones such as a void, vugular zone, or fracture; to plug a well for abandonment purposes; a temporary plug to divert treatment fluids; as a chemical packer to be used as a fluid in front of cement slurry in cementing operations; and to seal an annulus between the well bore and an expandable pipe or pipe string. For instance, the treatment fluid may withstand substantial amounts of pressure, for example, the hydrostatic pressure of a drilling fluid or cement slurry, without being dislodged or extruded. The treatment fluid may form a non-flowing, intact mass. This mass plugs the zone and inhibits loss of subsequently pumped drilling fluid, which allows for further drilling.

In some embodiments, the treatment fluids may be placed into an annulus of the well bore and allowed to set such that it isolates the subterranean formation from a different portion of the well bore. The treatment fluids may thus form a barrier that prevents fluids in that subterranean formation from migrating into other subterranean formations. Within the annulus, the fluid also serves to support a conduit, for example, casing, in the well bore.

In other embodiments, the treatment fluid may be positioned in a well bore in a multilateral well bore configuration including at least two principal well bores connected by one or more ancillary well bores.

In secondary cementing, often referred to as squeeze cementing, the treatment fluid may be strategically positioned in the well bore to plug a void or crack in the conduit, to plug a void or crack in the hardened sealant (for example, cement sheath) residing in the annulus, to plug a relatively small opening known as a microannulus between the hardened sealant and the conduit, and so forth, thus acting as a setting composition for sealing the wellbore.

In some embodiments, the treatment fluids according to the disclosure may be used in primary cementing operations, to cement a pipe string (for example, casing, liners, expandable tubulars, etc.) in place. In such a primary cementing operation, treatment fluid may be pumped into an annulus between the walls of the well bore and the exterior surface of the pipe string disposed therein. The treatment fluid may set in the annular space, thereby forming an annular sheath of hardened, substantially impermeable resin that may support and position the pipe string in the well bore and may bond the exterior surface of the pipe string to the subterranean formation. Among other things, the sheath surrounding the pipe string may function to prevent the migration of fluids in the annulus, as well as protecting the pipe string from corrosion.

Generally, the treatment fluids of the present disclosure may be introduced into a well bore using any suitable technique. For example, in some embodiments of the present disclosure, treatment fluids may be introduced into a well bore by drilling an interception well bore to "intercept" an existing well bore. Once communication with the existing well is established, the treatment fluid of the present disclosure may then be pumped into the well bore as is known in the art. However, if communication cannot be established, the treatment fluid may still be introduced into the existing well bore by "lubricating" the existing well bore. In this process, the treatment fluid may be injected into the existing well bore even though communication has not been established. This results in the compression of the fluids and material inside the well bore. Once the composition has been introduced into the well bore to be serviced, the buoyancy, density, or specific gravity of the weighting material in the composition may be used to facilitate the placement of the composition into a desired location within the well bore.

In an embodiment, the treatment fluid can be used as a chemical packer.

CONCLUSION

Therefore, the present disclosure is well adapted to attain the ends and advantages mentioned as well as those that are inherent therein.

The exemplary fluids disclosed herein may directly or indirectly affect one or more components or pieces of equipment associated with the preparation, delivery, recapture, recycling, reuse, or disposal of the disclosed fluids. For example, the disclosed fluids may directly or indirectly affect one or more mixers, related mixing equipment, mud pits, storage facilities or units, fluid separators, heat exchangers, sensors, gauges, pumps, compressors, and the like used generate, store, monitor, regulate, or recondition the exemplary fluids. The disclosed fluids may also directly or indirectly affect any transport or delivery equipment used to convey the fluids to a well site or downhole such as, for example, any transport vessels, conduits, pipelines, trucks, tubulars, or pipes used to fluidically move the fluids from one location to another, any pumps, compressors, or motors (for example, topside or downhole) used to drive the fluids into motion, any valves or related joints used to regulate the pressure or flow rate of the fluids, and any sensors (i.e., pressure and temperature), gauges, or combinations thereof, and the like. The disclosed fluids may also directly or indirectly affect the various downhole equipment and tools that may come into contact with the chemicals/fluids such as, but not limited to, drill string, coiled tubing, drill pipe, drill collars, mud motors, downhole motors or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

The particular embodiments disclosed above are illustrative only, as the present disclosure may be modified and practiced in different but equivalent manners apparent to those skilled in the art having the benefit of the teachings herein. It is, therefore, evident that the particular illustrative embodiments disclosed above may be altered or modified and all such variations are considered within the scope of the present disclosure.

The various elements or steps according to the disclosed elements or steps can be combined advantageously or practiced together in various combinations or sub-combinations of elements or sequences of steps to increase the efficiency and benefits that can be obtained from the disclosure.

It will be appreciated that one or more of the above embodiments may be combined with one or more of the other embodiments, unless explicitly stated otherwise.

The illustrative disclosure can be practiced in the absence of any element or step that is not specifically disclosed or claimed.

Furthermore, no limitations are intended to the details of construction, composition, design, or steps herein shown, other than as described in the claims.

What is claimed is:

1. A method of treating a treatment zone of a well, the method comprising:
   (A) providing a treatment fluid comprising (i) a resin; and (ii) a hardening agent for the resin; wherein the resin comprises a molecule having four to six heavy atoms;
   (B) introducing the treatment fluid into a well bore; and
   (C) allowing the treatment fluid to form a hardened mass in the well bore.

2. The method according to claim 1, wherein the heavy atom is a halogen.

3. The method according to claim 1, wherein the resin is an epoxy resin.

4. The method according to claim 2, wherein the epoxy resin comprises a diglycidyl ether.

5. The method according to claim 1, wherein the resin is selected from the group consisting of: 3,3 ', 5,5' tetrabromobisphenol A diglycidyl ether; 3,3 ', 5,5' tetrachlorobisphenol A diglycidyl ether; 3,3 ', 5,5' tetraiodobisphenol A diglycidyl ether; 4,4'-hexafluoroisopropylidenediphenol diglycidyl ether; and any combination thereof.

6. The method according to claim 1, wherein the hardening agent is selected from the group consisting of: an aliphatic amine, an aliphatic tertiary amine, an aromatic amine, a cycloaliphatic amine, a heterocyclic amine, an amido amine, a polyamide, a polyethyl amine, a polyether amine, a polyoxyalkylene amine, a carboxylic anhydride, triethylenetetraamine, ethylene diamine, N-cocoalkyltrimethylene, isophorone diamine, N-aminophenyl piperazine, imidazoline, 1,2-diaminocyclohexane, polytheramine, diethyltoluenediamine, 4,4'-diaminodiphenyl methane, methyltetrahydrophthalic anhydride, hexahydrophthalic anhydride, maleic anhydride, polyazelaic polyanhydride, and phthalic anhydride.

7. The method according to claim 1, wherein the fluid composition additionally comprises a solvent selected from the group consisting of: polyethelenglycol, a polyethyleneglycol ether, d-limonene, propylene carbonate, an isopariffinic fluid, and a heavy aromatic fluid.

8. The method according to claim 1, wherein the fluid composition additionally comprises a reactive diluent.

9. The method according to claim 1, wherein the treatment fluid further comprises: an accelerator that comprises 2,4,6 tridimethylaminomethylphenol.

10. The method according to claim 1, wherein the hardening agent further comprises a silane coupling agent.

11. The method according to claim 1, wherein the introducing of the treatment fluid is into an annulus between a tubing string in the well bore and a subterranean formation; and wherein the allowing the treatment fluid to form a hardened mass the well bore is within the annulus.

12. The method according to claim 1, further comprising selecting the molecule having at least one heavy atom to help control the density of the treatment fluid.

13. The method according to claim 1, wherein the hardening agent component comprises: diethyltoluenediamine.

14. The method according to claim 8, wherein the reactive diluent is selected from the group consisting of: an alkyl glycidyl ether and a phenyl glycidyl ether.

15. The method according to claim 1, wherein the treatment fluid further comprises a solid particulate.

16. The method according to claim 1, wherein the resin has a density of at least 10 ppg.

17. The method according to claim 1, wherein the resin has a density of at least 12 ppg.

18. The method according to claim 1, wherein the resin has a density of at least 14 ppg.

* * * * *